US009670942B2

(12) United States Patent
Karlsson et al.

(10) Patent No.: US 9,670,942 B2
(45) Date of Patent: Jun. 6, 2017

(54) SEPARATE HYDRAULIC UNIT WITH COOLING OF OIL

(71) Applicant: ATLAS COPCO CONSTRUCTION TOOLS AB, Stockholm (SE)

(72) Inventors: Magnus Karlsson, Ljungbyholm (SE); Torkel Danielsson, Nybro (SE)

(73) Assignee: CONSTRUCTION TOOLS PC AB, Kalmar (SE)

( * ) Notice: Subject to any disclaimer, the term of this patent is extended or adjusted under 35 U.S.C. 154(b) by 326 days.

(21) Appl. No.: 14/379,384

(22) PCT Filed: Feb. 11, 2013

(86) PCT No.: PCT/SE2013/050107
§ 371 (c)(1),
(2) Date: Aug. 18, 2014

(87) PCT Pub. No.: WO2013/122531
PCT Pub. Date: Aug. 22, 2013

(65) Prior Publication Data

US 2015/0013321 A1 Jan. 15, 2015

(30) Foreign Application Priority Data

Feb. 17, 2012 (SE) ....................................... 1250134

(51) Int. Cl.
*F16D 31/02* (2006.01)
*F15B 21/04* (2006.01)

(52) U.S. Cl.
CPC ... *F15B 21/042* (2013.01); *F15B 2211/20515* (2013.01); *F15B 2211/62* (2013.01)

(58) Field of Classification Search
CPC ..................................................... F15B 21/042
USPC ............................................... 60/456; 91/432
See application file for complete search history.

(56) References Cited

U.S. PATENT DOCUMENTS 3,470,968 A 10/1969 Melsheimer et al.
4,368,775 A * 1/1983 Ward ........................ F01P 3/00 60/456

FOREIGN PATENT DOCUMENTS

CN 201538019 U 8/2010
CN 201944041 U 8/2011
WO WO-2006079178 A1 8/2006

OTHER PUBLICATIONS

PCT/ISA/210—International Search Report—May 24, 2013 (Issued in PCT/SE2013/050107).

* cited by examiner

*Primary Examiner* — Michael Leslie
(74) *Attorney, Agent, or Firm* — Venable LLP; Jeffri A. Kaminski

(57) ABSTRACT

A separate hydraulic power pack for providing at least one user with an oil flow. The hydraulic unit includes a motor, a hydraulic pump driven by the motor, a tank, an oil inlet, an oil outlet, a heat exchanger, and a first conduit system for oil. The first conduit system connects at least the oil inlet, the heat exchanger, the oil tank, the hydraulic pump and the oil outlet. The heat exchanger is provided for liquid cooling of the oil. A cooling liquid inlet for connection to a cooling liquid source, a first cooling liquid outlet and a second conduit system for a cooling liquid.

23 Claims, 11 Drawing Sheets

SEPARATE HYDRAULIC UNIT WITH COOLING OF OIL

CROSS-REFERENCE TO RELATED APPLICATIONS

This application claims priority to Swedish patent application 1250134-2 filed 17 Feb. 2012 and is the national phase under 35 U.S.C. §371 of PCT/SE2013/050107 filed 11 Feb. 2013.

TECHNICAL FIELD

The present invention relates to a separate hydraulic unit for providing at least one user in the form of a hydraulic drilling machine or a hydraulic percussive breaking machine with an oil flow.

BACKGROUND

For example, in the mining industry hydraulic machines are used which do not have any internal unit for generating a pressure in a hydraulic fluid, typically hydraulic oil. One example of such hydraulic machines are rock drilling machines. These hydraulic machines thus, constitute users of an oil flow, which for example may have to amount to up to 40 liters/minute and have a pressure of 120 Bar. Thus, separate hydraulic units are used for providing the hydraulic machines with a pressurized oil flow.

A hydraulic unit comprises a motor which drives a hydraulic pump for generating a pressurized oil flow, an oil tank, and a heat exchanger for cooling of oil as it flows back from the user to the oil tank. It is desirable that a hydraulic unit for use in the mining industry is compact and manually movable in narrow mine galleries to be placed about 10-30 m behind a user. Also in other technical areas where hydraulic machines are used in tight spaces, use is found for such compact manually movable hydraulic units, one such example is percussive breaking machines, which are used for excavation in buildings. For example, the hydraulic unit called ATLAS COPCO HYDRAULIC POWER PACK LP 18-40 may be mentioned, which weighs about 130 kg and has the dimensions 815×605×690 mm, and which has a frame which is provided with a pair of wheels. ATLAS COPCO HYDRAULIC POWER PACK LP 18-40 comprises an air-cooled heat exchanger which is equipped with a fan and an electric motor in the form of an asynchronous motor.

There is a need for more compact separate hydraulic units, inter alia within the mining industry and on building sites.

SUMMARY OF THE INVENTION

An object is to provide a compact separate hydraulic unit for use within inter alia the mining industry and on building sites.

This object is achieved according to one aspect, with a separate hydraulic unit for providing at least one user in the form of a hydraulic drilling machine or a hydraulic percussive breaking machine with an oil flow. The hydraulic unit comprises: a motor, a hydraulic pump driven by the motor, an oil tank, an oil inlet, an oil outlet, a heat exchanger, and a first conduit system for oil. The first conduit system connects at least the oil inlet, the heat exchanger, the oil tank, the hydraulic pump and the oil outlet. The heat exchanger is arranged for liquid cooling of oil. The hydraulic unit comprises a cooling liquid inlet for connection to a cooling liquid source, a first cooling liquid outlet and a second conduit system for cooling liquid. The second conduit system connects at least the cooling liquid inlet, the first cooling liquid outlet, and the heat exchanger.

Since the separate hydraulic unit comprises a heat exchanger which is arranged for liquid cooling of the oil, the separate hydraulic unit is more compact than if a fan-cooled air heat exchangers is used, as in the prior art. On the one hand, the heat exchanger arranged for liquid cooling is more compact than an air heat exchanger, on the other hand the fan may be completely dispensed with. The cooling liquid inlet, the cooling liquid outlet, and the second conduit system do not take up space to a corresponding extent. Accordingly, the above mentioned object is achieved.

The term separate hydraulic unit should be construed as the hydraulic unit being freestanding from the user. The separate hydraulic unit is connected with the user by means of oil conduits, typically flexible oil hoses, a supply line to the user and a return line from the user back to the separate hydraulic unit. The separate hydraulic unit may be provided with pressurized cooling liquid and may therefore dispense with a cooling liquid pump. The primary function of the motor in the separate hydraulic unit may be to drive the hydraulic pump. According to some embodiments, even the only function of the motor in the separate hydraulic unit may be to drive the hydraulic pump. The separate hydraulic unit may be used for example in the mining industry or the construction industry.

According to embodiments, the heat exchanger may comprise a first conduit section and a second conduit section arranged in thermal contact with each other. The first conduit section may be connected to the first conduit system and the second conduit section may be connected to the second conduit system. In this way, during operation, the oil may be directed to and from the first conduit section of the heat exchanger and may be cooled by the cooling liquid in the second conduit section.

According to embodiments, the separate hydraulic unit may comprise a regulator for cooling liquid pressure arranged in the second conduit system between the cooling liquid inlet and the heat exchanger. In this manner, cooling liquid pressure and/or flow in the separate hydraulic unit may be adjusted to a level appropriate for the heat exchanger and the second conduit section. The separate hydraulic unit is thus, adapted to be provided with a pressurized cooling liquid. The cooling liquid pressure is adjusted by the regulator to a level appropriate for the heat exchanger and the second conduit section, for example to a maximum of 5 Bar.

According to embodiments, the regulator may comprise:

a first elastic conduit arranged to be flowed through by cooling liquid, a hollow elastic element arranged to be affected by liquid pressure in the cooling liquid, which hollow elastic element changes an outer dimension depending on the liquid pressure, and a movable element arranged between the first elastic conduit and the hollow elastic element. The movable element abuts against the hollow elastic element such that a position of the movable element is affected by the outer dimension of the hollow elastic element. A position of the movable element affects a first cross-section of the first elastic conduit. The regulator has a primary side upstream of the first cross-section and a secondary side downstream of the first cross-section. The hollow elastic element is arranged to be affected by a liquid pressure on the secondary side. In this manner, a robust regulator may be provided in the separate hydraulic unit.

According to embodiments, the movable element may comprise a protruding edge arranged to abut against the first elastic conduit such that the first cross-section is changed depending on the position of movable element. By means of the edge, a limited abutment against the first elastic conduit may be provided and thus, a distinct change in the first cross-section and a corresponding cross-sectional area may be achieved.

According to embodiments, the movable element may be biased in a direction towards the hollow elastic element. In this manner, in addition to the elasticity of the hollow elastic element, also the biasing may be used to affect the force, by means of which a pressure in the cooling liquid makes the movable element abut against the first elastic conduit.

According to embodiments, the movable element may be biased by a spring. A force by which the spring abuts against the movable element may be adjustable. In this manner, regulating characteristics of the regulator may be adjusted.

According to embodiments, the second conduit system may comprise a third conduit section arranged in thermal contact with the motor. In this manner, the motor may be cooled by cooling liquid during operation of the separate hydraulic unit. For example, a screw and/or a nut may be used to adjust the force.

According to embodiments, the second conduit system may be connected with a second cooling liquid outlet via a controllable first valve. By opening the controllable first valve an increased flow of cooling liquid through the second conduit system may be achieved.

According to alternative embodiments, the first conduit system may comprise a fourth conduit section arranged in thermal contact with the motor. In this manner, the motor may be cooled by oil during operation of the separate hydraulic unit.

According to embodiments, the hydraulic pump may be arranged inside the oil tank.

According to embodiments, the oil tank may be provided with a volume compensator arranged inside the oil tank. The volume compensator may be arranged to expand when a volume of oil in the oil tank decreases. In this manner, air pockets in the oil tank may be substantially avoided if an amount of oil in the tank should decrease from a filled level. Thus, an oil flow from the pump may be ensured even if the separate hydraulic unit should be placed on an inclined support.

According to embodiments the volume compensator may comprise at least one movable piston. The volume compensator may occupy a smaller volume in the oil tank when the piston is in a first position than when the piston is in a second position. In this manner the volume compensation in the oil tank may be achieved.

According to embodiments the volume compensator may comprise a spring and the movable piston may be moved to the second position by the spring.

According to embodiments, a position indicator may be connected to the movable piston and may be visible from outside the oil tank, at least when the piston is in the first position. In this manner, a user may see when the piston is in its first position, for example, to be able to determine if oil needs to be refilled in the separate hydraulic unit.

According to embodiments, a second valve may be arranged in the oil tank. The second valve may be arranged for venting the oil tank. In this manner, the second valve may be opened when the oil is replenished in the oil tank. Oil in the oil tank may be replenished via the inlet conduit. A check valve may be arranged in the first conduit system between the oil inlet and the oil tank. In this manner, it may be ensured that no oil is forced out by the volume compensator via the oil inlet. An automatic venting of the oil tank also may be performed by a control device of the hydraulic unit by means of the level sensor and the second valve. The second valve, in this case is controllable by the control device.

According to embodiments the motor may be an electric motor and the hydraulic unit may comprise a control device arranged at least for controlling the electric motor.

According to embodiments, the electric motor may be a permanent magnet motor. This is a compact electric motor type which occupies a small space.

According to embodiments, the separate hydraulic unit may comprise a temperature sensor arranged at the electric motor, and which the temperature sensor may be connected to the control device. The control device may be arranged to open the controllable first valve when the electric motor temperature exceeds a first threshold value. In this manner, overheating of the motor may be avoided as a flow, or an increasing flow, of cooling liquid through the third conduit section is achieved.

According to embodiments, the separate hydraulic unit may comprise a control device for controlling the electric motor and a temperature sensor may be arranged at the electric motor and connected to the control device. The control device may be arranged to reduce a power output provided by the electric motor when the electric motor temperature exceeds a second threshold value. In this manner, an overheating of the motor may be avoided. Oil flow and oil pressure from the separate hydraulic unit may be reduced in such a reduction of power output of the electric motor.

According to embodiments, the control device may be arranged to stop the electric motor when the electric motor temperature exceeds a third threshold value. In this manner, overheating of the motor may be avoided if a reduction of the provided power output from the electric motor would not be enough to avoid overheating of the motor.

According to embodiments, the hydraulic unit may be arranged to generate an oil pressure of up to 240 Bar and a flow of oil of up to 80 liters/minute.

According to embodiments, the hydraulic pump may be directly driven by the motor. A compact separate hydraulic unit may thus be achieved by avoiding the use of a transmission arrangement between the motor and the hydraulic pump.

According to embodiments, the separate hydraulic unit may comprise a frame of metal tubes, which surrounds remaining components of the hydraulic unit. In this manner, there is provided a separate hydraulic unit which is protected inside the frame.

According to embodiments, the frame may comprise support surfaces, which support surfaces form abutment points of the separate hydraulic unit against a support. The separate hydraulic unit, if necessary, may be dragged along a mining gallery or in a narrow corridor on its support surfaces. The support surfaces may be formed by special wearing strips. The frame additionally, or alternatively, may be provided with wheels.

According to embodiments, the separate hydraulic unit may have a weight of less than 50 kg. In this manner, the separate hydraulic unit is manually movable.

Within many technical fields there is a need to regulate a liquid pressure. Particularly, in fields where a liquid, whose pressure is to be regulated, contains solid particles such as sand or fibres, there is a need for a pressure regulator which is robust. A further object therefore, according to one aspect, is to provide a robust regulator for controlling of a liquid pressure.

This object is achieved by a regulator, comprising:

a first elastic conduit arranged to be flowed through by liquid, a hollow elastic element arranged to be affected by a liquid pressure in the liquid, which hollow elastic element, changes an outer dimension in dependence of the liquid pressure, and a movable element arranged between the first elastic conduit and the hollow elastic element. The movable element abuts against the hollow elastic element such that a position of the movable element is affected by the outer dimension of the hollow elastic element. A position of the movable element affects a first cross-section of the first elastic conduit. The regulator has a primary side upstream of the first cross-section and a secondary side downstream of the first cross-section. The hollow elastic element is arranged to be affected by a liquid pressure on the secondary side.

Because the regulator utilizes the first elastic conduit, the first cross-section of which is changed, the regulator is not particularly sensitive to solid particles. Separate pressure controlling moving parts in the flow path of the liquid thus may be avoided. In this manner, a robust regulator may be provided and the above-mentioned object is achieved.

According to embodiments, a conduit connection may extend between the secondary side and the hollow elastic element. Thus, the elastic element may be influenced by the liquid pressure on the secondary side via the conduit connection.

According to embodiments, the movable element may comprise a protruding edge arranged to abut against the first elastic conduit such that the first cross-section is changed depending on the position of the movable element. By means of the edge, a limited abutment against the first elastic conduit may be achieved and thus, a distinct change of the first cross-section and a corresponding cross-sectional area may be achieved.

According to embodiments, the movable element may be biased in a direction towards the hollow elastic element. In this manner, in addition to the elasticity of the hollow elastic element also the biasing may be utilized to influence the force, with which a pressure in the liquid makes the movable element abut against the first elastic conduit.

According to embodiments, the movable element may be biased by a spring, wherein a force, with which the spring abuts against the hollow elastic element is adjustable. In this manner, the regulating characteristics of the regulator may be adjusted.

Within several technical fields there is a need for a tank, inside which air pockets are limited in size or completely avoided, when liquid is drained from the tank. A further object thus, according to one aspect, is to provide a tank for a liquid, inside which air pocket size is minimized.

This object is achieved by a tank for a liquid, which tank is provided with a volume compensator arranged inside the tank. The volume compensator is arranged to expand when a liquid volume in the tank decreases.

The volume compensator, in this manner will take up a volume corresponding to discharged liquid. Thus, no air pocket may be formed in the tank or only a relatively small air pocket may be formed. Thus, the above mentioned object is achieved.

The tank may be provided with an inlet and an outlet. Particularly effective is the tank with volume compensator in applications where liquid is discharged from the tank while liquid is filled into the tank. One example is an oil tank, from which oil is pumped under high pressure to a hydraulic tool and oil with a lower pressure is returned to the oil tank from the hydraulic tool.

According to embodiments, the volume compensator may comprise at least a movable piston, wherein the volume compensator occupies a smaller volume in the tank when the piston is in a first position than when the piston is in a second position. In this manner the volume compensation in the tank may be achieved.

According to embodiments, the piston may be movably arranged in a tube, which tube has an opening at each end. At a first end, the tube communicates with an ambient environment of tank. At a second end, the tube communicates with an inner space of the tank.

According to embodiments, the volume compensator may comprise a spring and the movable piston may be moved to the second position by the spring.

According to embodiments, a position indicator may be connected to the movable piston and may be visible from outside the tank, at least when the piston is in the first position. In this manner, a user may see when the piston is in its first position for example, to determine if liquid needs to be refilled in the tank.

Further features of, and advantages with, the present invention are evident from the appended claims and the following detailed description. Those skilled in the art will realize that different features of the invention may be combined to create embodiments other than those described below. This without departing from the scope of the present invention as it is defined by the appended claims.

BRIEF DESCRIPTION OF THE DRAWINGS

Various aspects of the invention, including its particular features and advantages, are evident from the following detailed description and the accompanying drawings, in which.

DETAILED DESCRIPTION

The present invention will now be described in more detail with reference to the accompanying drawings, in which examples of embodiments are shown. The invention should not be construed as limited to the described examples of embodiments. Like numbers in the figures refer throughout to like elements. For the sake of simplicity, well-known functions or constructions will not necessarily be described in detail.

Figure 1:
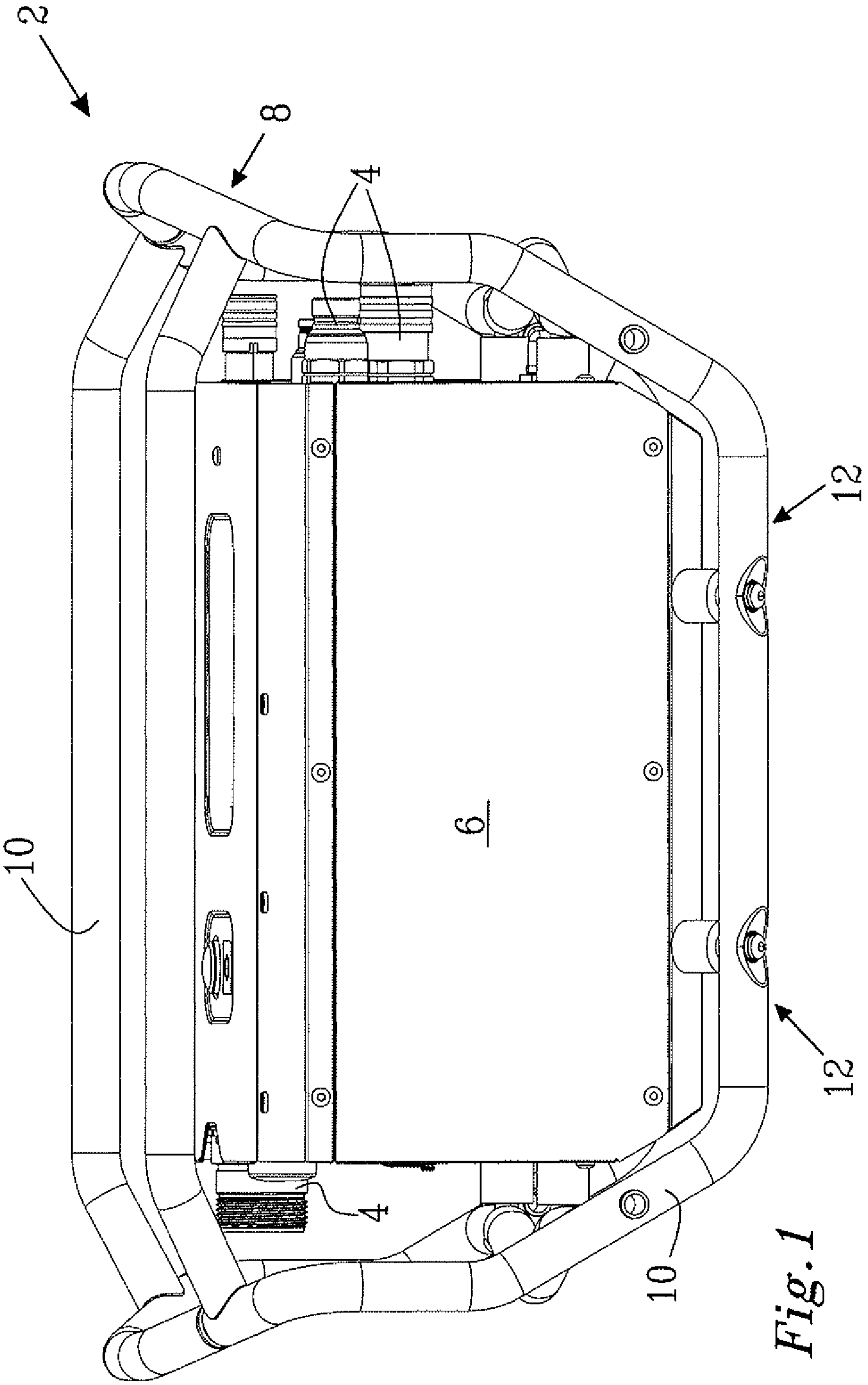
FIG. 1 illustrates a separate hydraulic unit according to embodiments.

FIG. 1 illustrates embodiments of a separate hydraulic unit 2 for supplying at least one user in the form of a hydraulic drilling machine or a hydraulic percussive breaking machine with an oil flow, hereinafter referred to as hydraulic unit 2. The hydraulic unit 2 comprises a number of components such as an electric motor, a hydraulic pump, an oil tank, a heat exchanger arranged for liquid cooling of oil and connectors 4 for connection of external conduits. Cover plates 6 cover the components. The components of the hydraulic unit 2 are surrounded by a frame 8 formed of metal tubes 10. The frame 8 comprises support surfaces 12, which form abutment points of the hydraulic unit 2 against a support. The support surfaces 12 may be formed by portions of the metal tubes 10 themselves or by special elements attached to the metal tubes 10. The metal tubes 10 may comprise for example, steel tubes and/or aluminium tubes.

The hydraulic unit 2 may suitably have a weight of less than 50 kg, and its outer dimensions may be e.g. about 700×350×400 mm. The hydraulic unit 2 thus, easily may be lifted by two persons and is compact enough to be pulled along e.g. narrow mining galleries or along narrow corridors in buildings. The hydraulic unit 2 may be arranged to produce an oil flow of 40 liters/minute and an oil pressure of 120 Bar, wherein a maximum power consumption is 12 kW. The electric motor is arranged for driving the hydraulic pump. The heat exchanger has a cooling capacity of about 6 kW and is arranged to cool the oil by means of the cooling liquid to 40 degrees Celsius before it flows into the oil tank.

Figure 2:
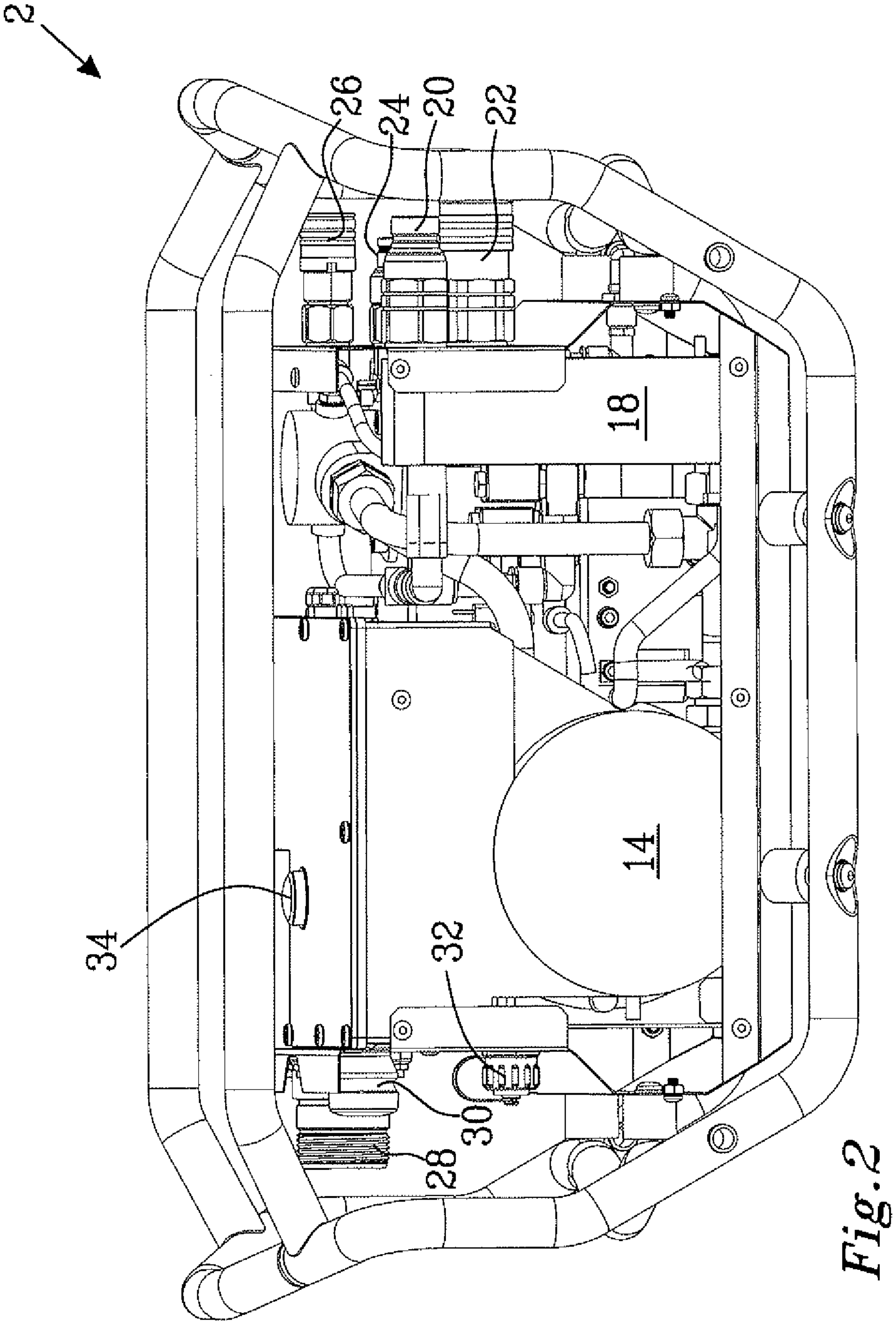
FIGS. 2 and 3 illustrate two different side views of the separate hydraulic unit of FIG. 1 with the cover plates removed.
Figure 3:
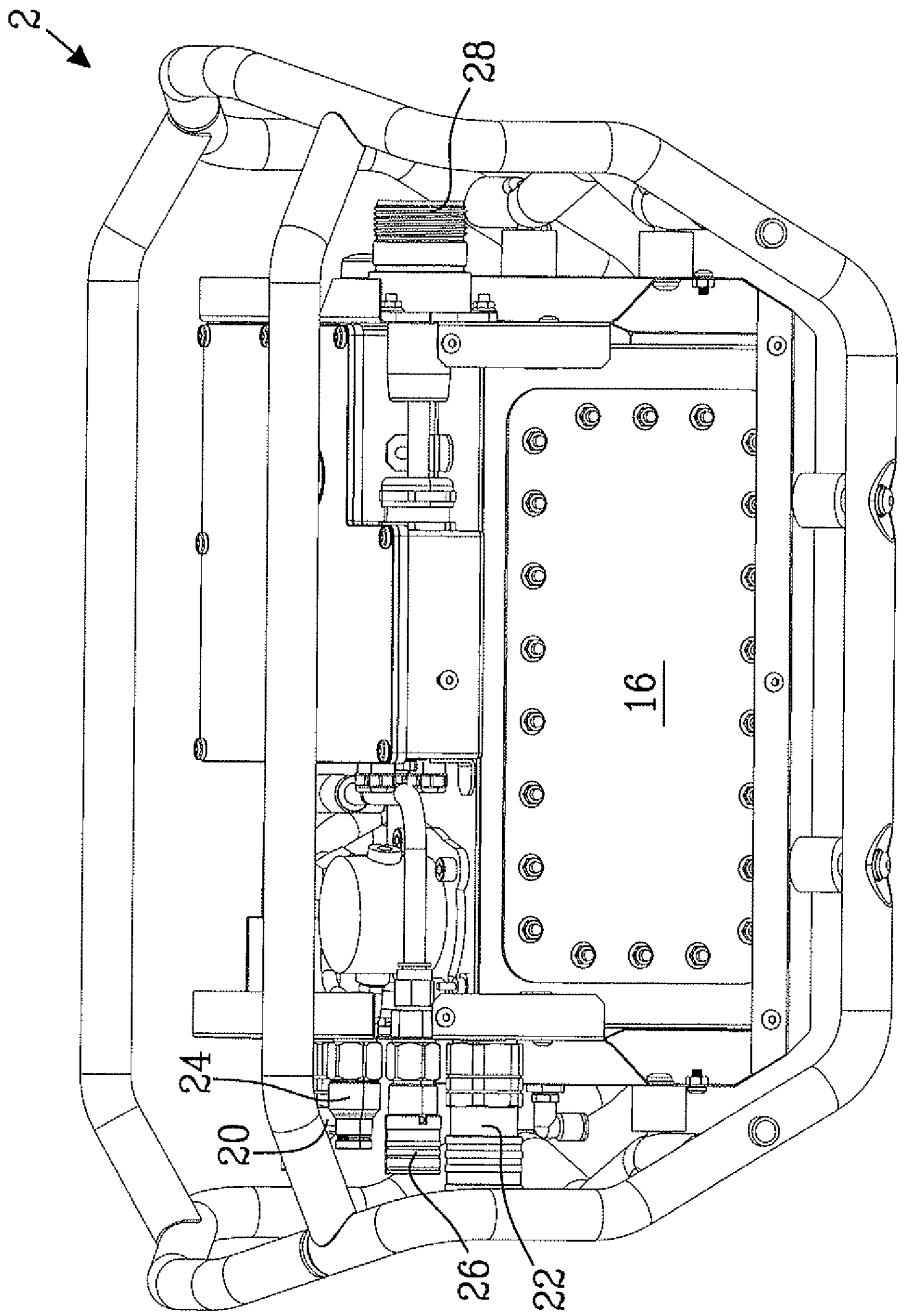

FIGS. 2 and 3 illustrate two different side views of the hydraulic unit 2 of FIG. 1 with the cover plates 6 removed. The hydraulic unit 2 comprises the electric motor 14 which drives the hydraulic pump. The electric motor 14 is a permanent magnet motor, which is compact and suited for direct drive of the hydraulic pump. For example, a permanent magnet motor with 9.5 kW input power and 6300 rev/min may be used in the hydraulic unit 2. The hydraulic pump is arranged inside the oil tank 16. For example, a rotary screw pump may be used in the hydraulic unit 2. An example of such a pump is the pump Settima GR28. The heat exchanger 18 is constituted by a soldered or gasketed plate heat exchanger, which in known manner comprises a first conduit section and a second conduit section arranged in thermal contact with each other. At one side of the hydraulic unit 2, connections for liquids are arranged: an oil inlet 20, an oil outlet 22, a cooling liquid inlet 24, and a first cooling liquid outlet 26. The hydraulic unit 2 further comprises a first conduit system for oil. The first conduit system connects the components in the hydraulic unit 2, which are flowed through by oil, for example the oil inlet 20, the heat exchanger 18, the oil tank 16, the hydraulic pump and the oil outlet 22. The hydraulic unit 2 further comprises a second conduit system for cooling liquid. The second conduit system connects the components which are flowed through by cooling liquid, for example the cooling liquid inlet 24, the first cooling liquid outlet 26 and the heat exchanger 18. Portions of the first and second conduit system are illustrated in FIGS. 2 and 3 in the form of various conduit sections.

In operation of the hydraulic unit 2, a pressurized flow of oil flows to a user of an oil flow via the oil outlet 22. The oil flows in return from the user via the oil inlet 20 into the hydraulic unit 2. The oil is cooled in heat exchanger 18 by a cooling liquid, e.g. cooling water. The cooling liquid flows into the hydraulic unit 2 via the cooling liquid inlet 24 and out of the hydraulic unit 2 via the first cooling liquid outlet 26.

At a second side of the hydraulic unit 2, a connection 28 for electrical power supply is arranged. On the same side also a connection for electronic data transmission, such as a USB connector, and an emergency stop button 30 are arranged. The connection for electronic data transmission is arranged protected under a lid 32. On a third side of the hydraulic unit 2 an on/off switch 34 is arranged.

Figure 4:
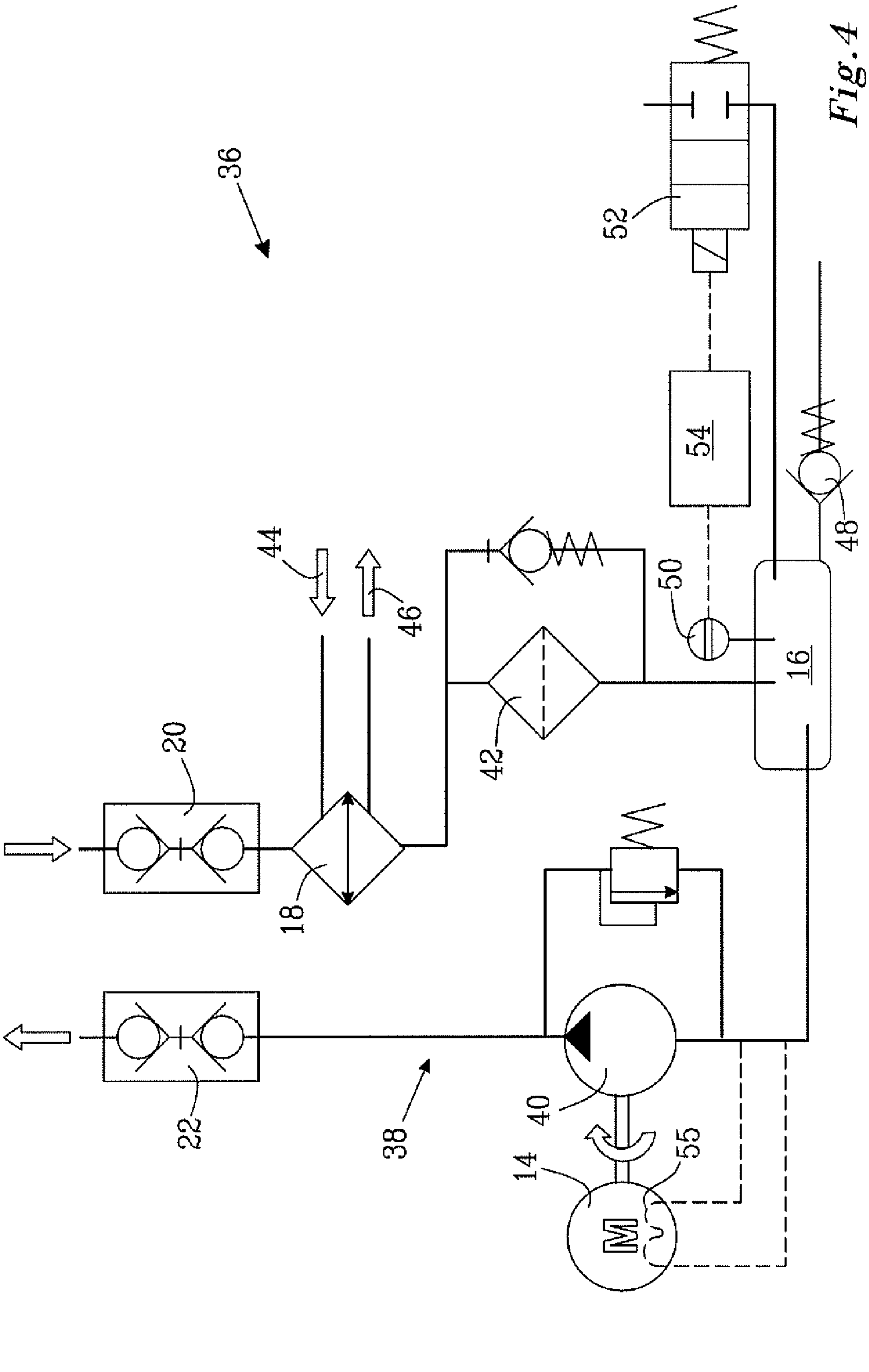
FIG. 4 illustrates an oil circuit for a separate hydraulic unit according to embodiments.

FIG. 4 illustrates an oil circuit 36 for a hydraulic unit according to embodiments. The hydraulic unit is adapted to provide at least one user with a flow of oil. The oil circuit 36 comprises a first conduit system 38, which connects the various components of the oil circuit 36. During operation, the oil is pressurized by a hydraulic pump 40, which is directly driven by an electric motor 14. The pressurized oil flows via an oil outlet 22 to the user. The oil flows from the user into the oil circuit 36 via an oil inlet 20. On its way to the oil tank 16, the oil flows through a heat exchanger 18 and an oil filter 42. The oil is cooled in heat exchanger 18 by a cooling liquid indicated by arrows 44, 46 in FIG. 4. The oil inlet 20 and the oil outlet 22 each comprise a check valve which prevents oil from flowing out of the hydraulic unit 2 when it is not connected to a user. Such a check valve may form part of a so-called quick coupling.

The oil inlet 20 may also be used to replenish oil in the oil tank 16. An overflow valve 48 is arranged at the oil tank 16. Through the overflow valve 48, oil may flow out of the oil tank 16 if too much oil should be fed to the oil tank 16. A level sensor 50 and a second valve 52 for venting are arranged at the oil tank 16. The level sensor 50 and the second valve 52 are connected to a control device 54. The control device 54 is arranged to open and close the second valve 52 in response to an oil level in the oil tank 16 as sensed by level sensor 50. The first conduit system 38 may comprise a fourth conduit section 55 arranged in thermal contact with the electric motor 14. Thus, the motor may be cooled by oil flowing from the oil tank 16 to the electric motor 14. The fourth conduit section 55 and conduits leading up to it are illustrated with dashed lines in FIG. 4, as these illustrate an alternative way of cooling the electric motor 14 to a cooling by means of cooling liquid in accordance with embodiments described in connection with FIG. 5 below.

Figure 5:
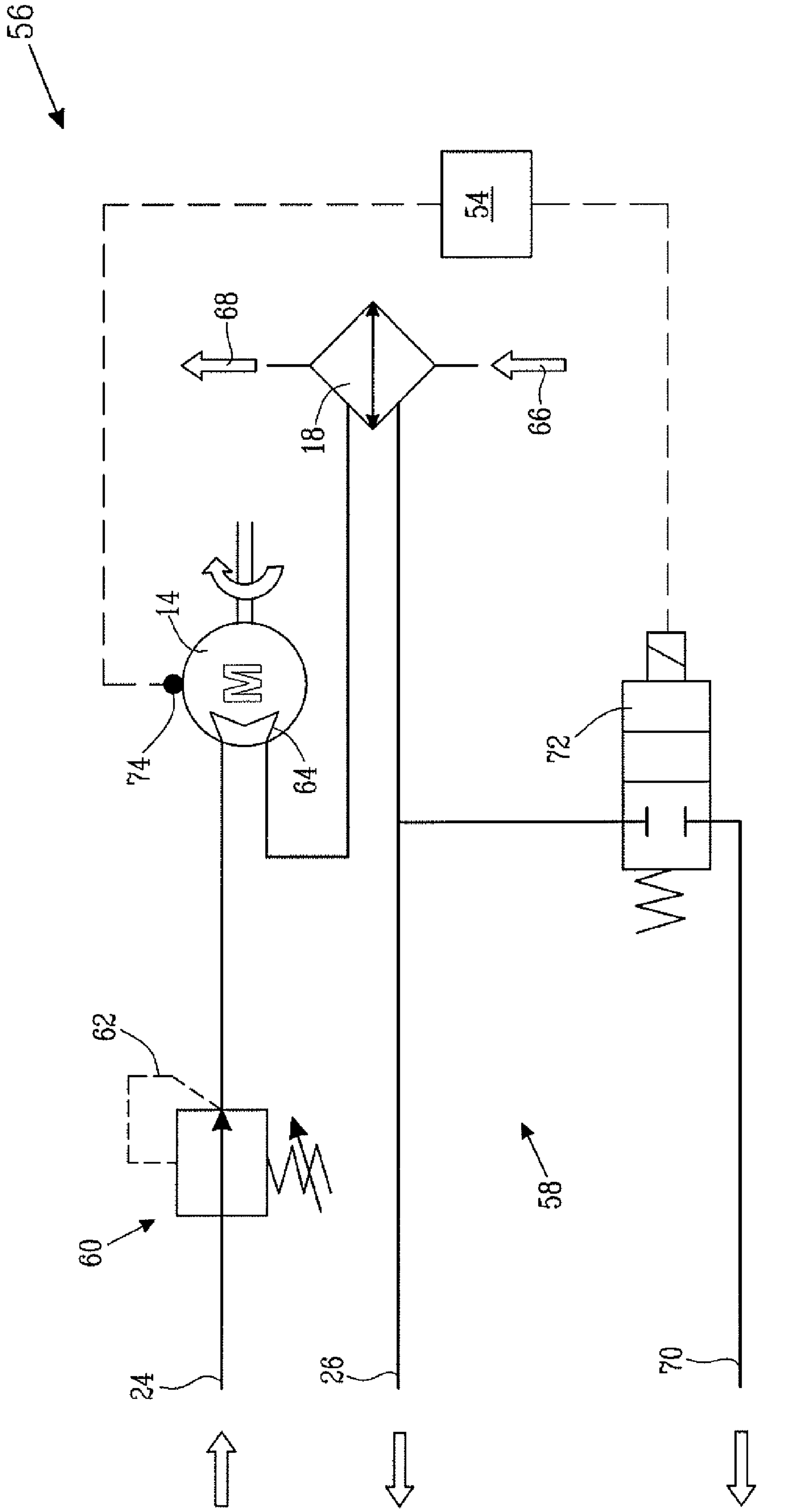
FIG. 5 illustrates a cooling liquid circuit of a separate hydraulic unit according to embodiments.

FIG. 5 illustrates a cooling liquid circuit 56 for a hydraulic unit according to embodiments. The hydraulic unit is adapted to provide at least one user with a flow of oil. The cooling liquid circuit 56 includes a second conduit system 58, which connects the various components of the cooling liquid circuit 56. During operation, cooling liquid flows through the cooling liquid circuit 56. Cooling liquid from a cooling liquid source flows into the cooling liquid circuit 56 via a cooling liquid inlet 24. It is common for cooling liquid in the form of cooling water to be led to the hydraulic unit from an accumulation of water high above the level at which the hydraulic unit is situated during operation in a mine. The cooling water thus, may have a high pressure and the hydraulic unit is therefore provided with a regulator 60 for cooling liquid pressure, which limits the cooling liquid pressure in the hydraulic unit. The regulator 60 has a control line 62 for sensing a cooling liquid pressure on the outlet side (secondary side) of the regulator 60, and is arranged to regulate the cooling liquid pressure in dependence of the cooling liquid pressure on the outlet side of the regulator 60. The second conduit system 58 comprises a third conduit section 64 arranged in thermal contact with an electric motor

14. A heat exchanger 18 for cooling of oil in the hydraulic unit is arranged in the cooling liquid circuit 58. The flow of the oil through the heat exchanger 18 is indicated by arrows 66, 68. The electric motor 14 is arranged for driving a hydraulic pump of the hydraulic unit. Thus, the cooling liquid flows through the cooling liquid circuit 58 and cools during operation of the hydraulic unit, the electric motor 14 as well as the oil which passes through the heat exchanger 18. In a first operating mode, the cooling liquid flows out of the cooling circuit 58 through a first cooling liquid outlet 26. The cooling liquid may be conducted from the first cooling liquid outlet 26 to other equipment, such as a rock drilling machine or other kind of machine.

A second cooling liquid outlet 70 is connected to the second conduit system 58. A controllable first valve 72 is arranged to open and close the second cooling liquid outlet 70. At the electric motor 14, a temperature sensor 74 is arranged. A control device 54 is connected to the temperature sensor 74 and the first controllable valve 72. The control device 54 is arranged to open the first controllable valve 72 when the electric motor 14 the temperature, sensed by temperature sensor 74, exceeds a first threshold value, e.g. 100 degrees Celsius. In a second operating mode, cooling liquid thus, flows out of the cooling circuit 56 via the first cooling liquid outlet 26 as well as via the second cooling liquid outlet 70. By opening the first controllable valve 72, an increased flow of cooling liquid through the second conduit system 58 may be achieved. This second operating mode may for example occur if the cooling liquid flow through the first cooling liquid outlet is reduced or if the electric motor 14 is heavily loaded.

Figure 6:
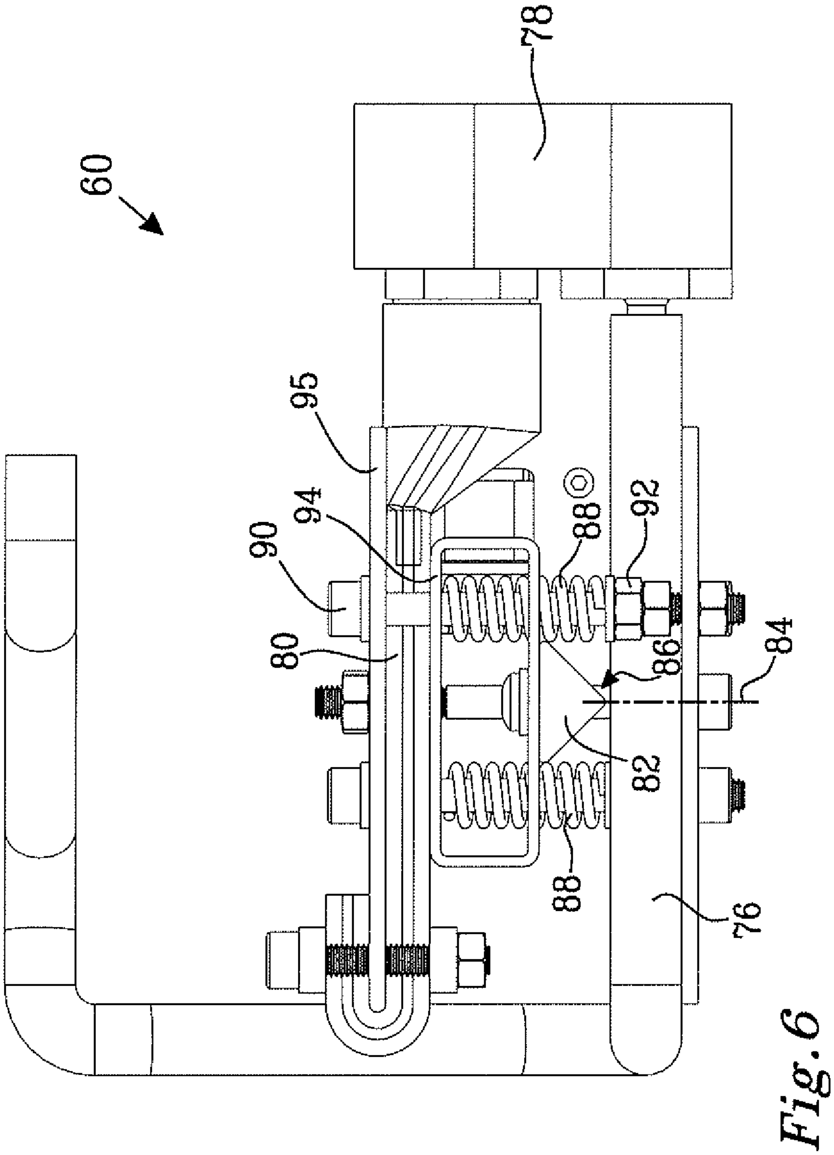
FIG. 6 illustrates a regulator for a liquid pressure according to embodiments.

FIG. 6 illustrates a regulator 60 to a liquid pressure according to embodiments. The regulator 60 may be used e.g. in a hydraulic unit for controlling a cooling liquid pressure in a cooling liquid circuit of the hydraulic unit, but may also be used to control a liquid pressure of liquids in other contexts. The regulator 60 comprises a first elastic conduit 76 arranged to be flowed through by liquid, e.g. a cooling liquid such as cooling water. The regulator 60 further comprises a connector block 78 and a hollow elastic element 80 and a movable element 82. The connector block 78 is arranged at an outlet end of the first elastic conduit 76 and comprises a conduit connection between the first elastic conduit 76 and the hollow elastic element 80. The hollow elastic element 80 is closed at an end opposite to the conduit connection. The hollow elastic element 80 will thus, be influenced by a liquid pressure in the liquid such that it changes an outer dimension depending on the liquid pressure.

The movable element 82 is arranged between the first elastic conduit 76 and the hollow elastic element 80. The movable element 82 abuts against the hollow elastic element 80 such that the position of the movable element 82 is affected by the outer dimension of the hollow elastic element 80. A position of the movable element 82 affects a first cross-section of the first elastic conduit 76. The first cross-section is indicated by a line 84 in FIG. 6. An affecting of the first cross-section entails inter alia a change in the cross sectional area of the first cross-section. The movable element 82 comprises a protruding edge 86 arranged to abut against the first elastic conduit 76.

The regulator 60 has a primary side upstream of the first cross-section and a secondary side downstream of the first cross-section. Via the connection in the connector block 78, the hollow elastic element 80 is arranged to be affected by a liquid pressure on the secondary side of the regulator 60. The regulator 60 thus, is arranged to control the liquid pressure in response to the liquid pressure on the secondary side of the regulator 60.

The movable element 82 is biased in a direction towards the hollow elastic element 80 by two springs 88. A force, by which each spring 88 abuts against the hollow elastic element 80, is adjustable by a screw 90 and a nut 92. By screwing a nut in a direction towards an abutment portion 94 of the movable element 82, the force is increases and vice versa. The hollow elastic element 80 abuts against a wall 95 on a side opposite the abutment portion 94 of the movable element 82.

Figure 7:
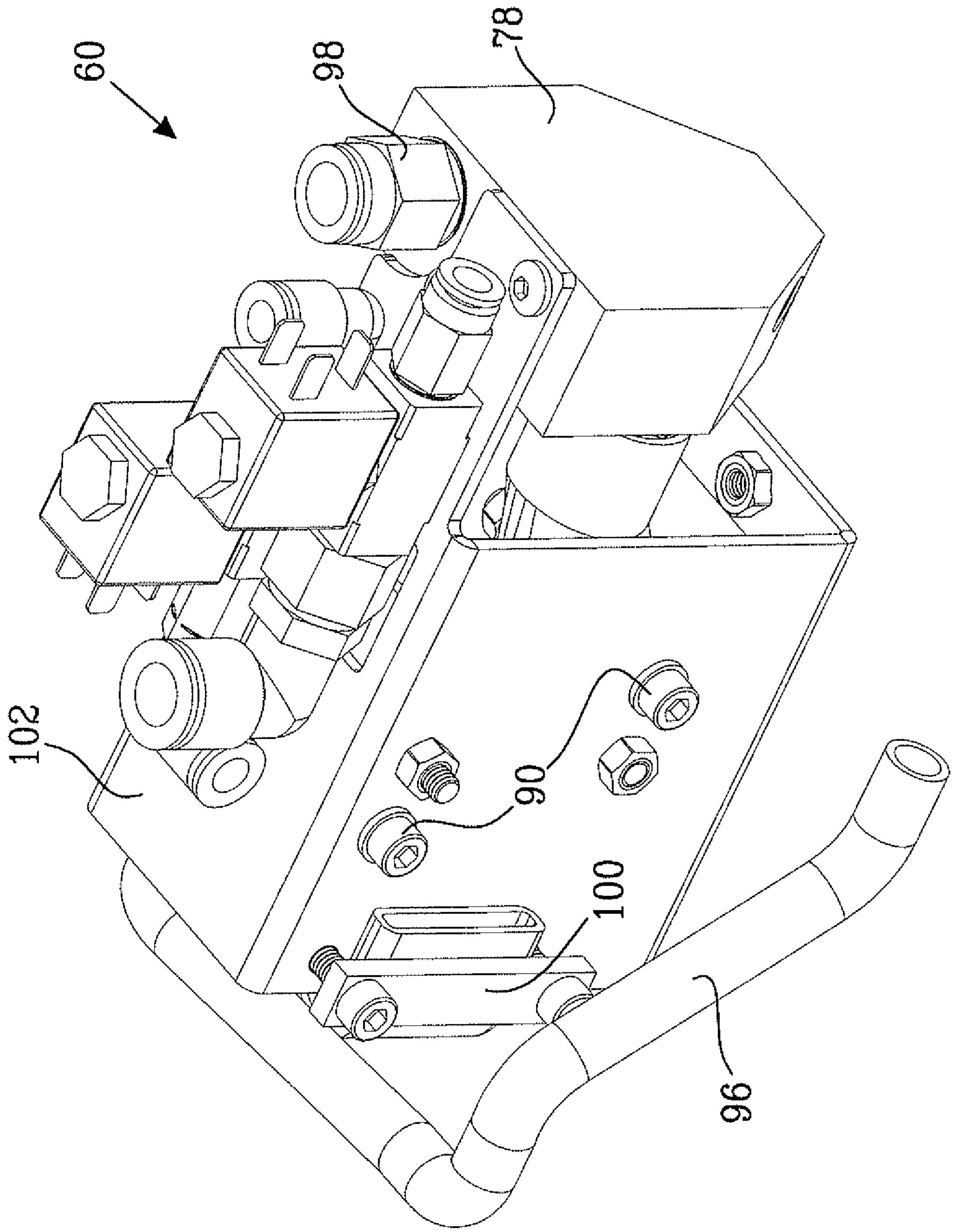
FIG. 7 illustrates the regulator of FIG. 6 in perspective.

FIG. 7 illustrates the regulator 60 of FIG. 6 in perspective. An inlet conduit 96 leads to the first elastic conduit (not visible in FIG. 7). At the connector block 78, an outlet connection 98 from the regulator 60 is provided. The hollow elastic element 80, at one of its ends, is connected to the connector block 78, and at its other end, is closed by a clip 100 which is secured to a frame 102 of the regulator 60. Screw heads of the screws 90 for adjusting the bias of the springs 88 (not visible in FIG. 7) are accessible from one side of the frame 102.

In use in a hydraulic unit 2 described above in connection with FIGS. 1-5, the regulator 60 is arranged to limit the liquid pressure on the secondary side to a maximum of 5 Bar. The regulator 60 controls the liquid flow to a maximum of 25 liters/minute. A cooling liquid source which is connected to the hydraulic unit should suitably have a capacity of at least 12 liters/minute to effect a cooling of oil in the hydraulic unit 2 to 40 degrees Celsius. According to an example embodiment, the first elastic conduit 76 comprises a tube of polyurethane with an inner diameter of 9.5 mm and an outer diameter of 13 mm, the hollow elastic element 80 comprises a tube of PVC with an inner diameter of 25 mm and an outer diameter of 28 mm, which is flattened in a non-pressurized state, and the two springs 88 provide a spring force of 0-92 Newton each. The movable element 82 may have a stroke of about 15 mm.

Figure 8:
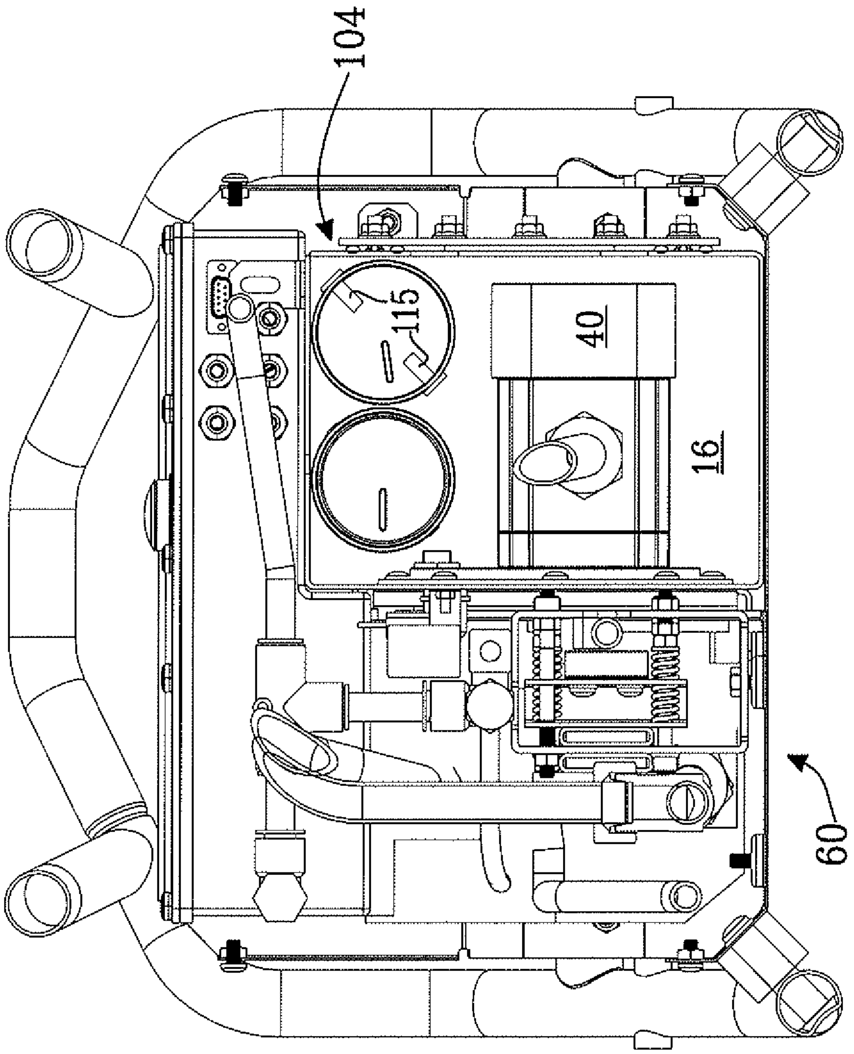
FIGS. 8-10 illustrate three different cross-sections through a separate hydraulic unit according to the embodiments.
Figure 9:
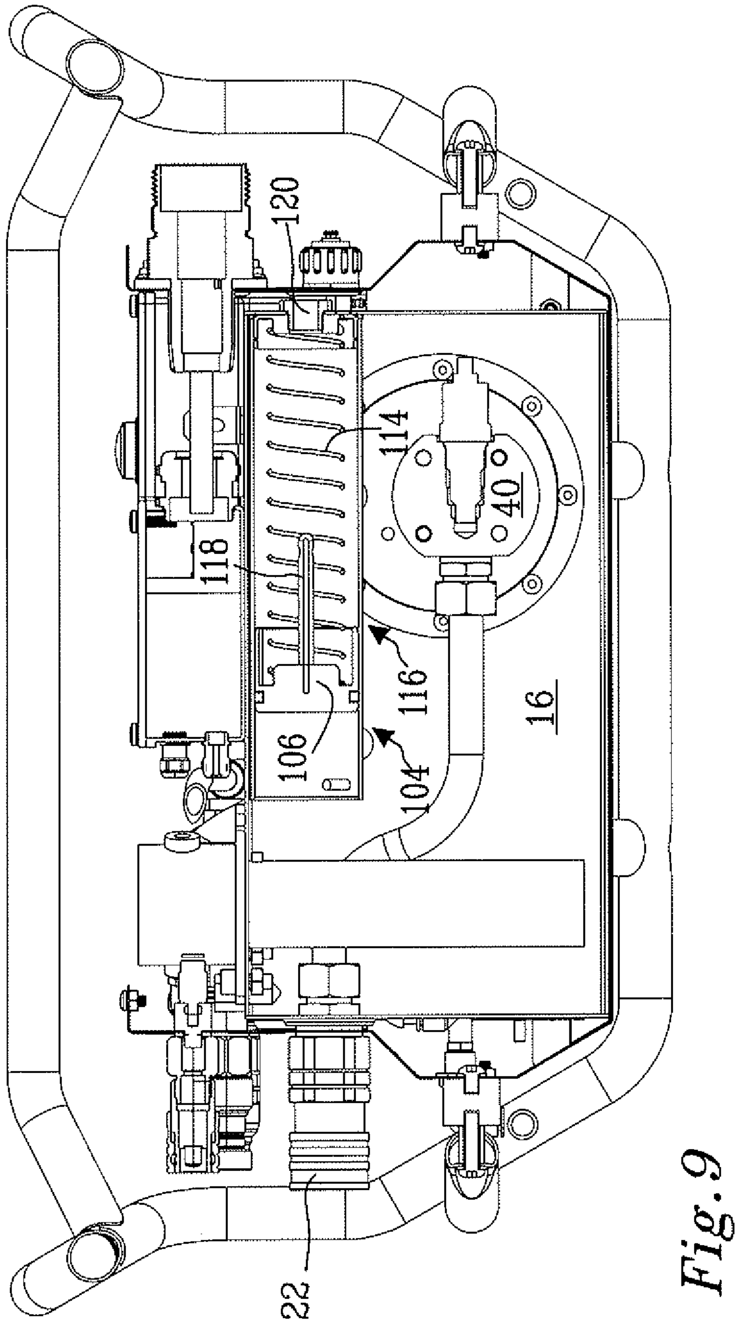
Figure 10:
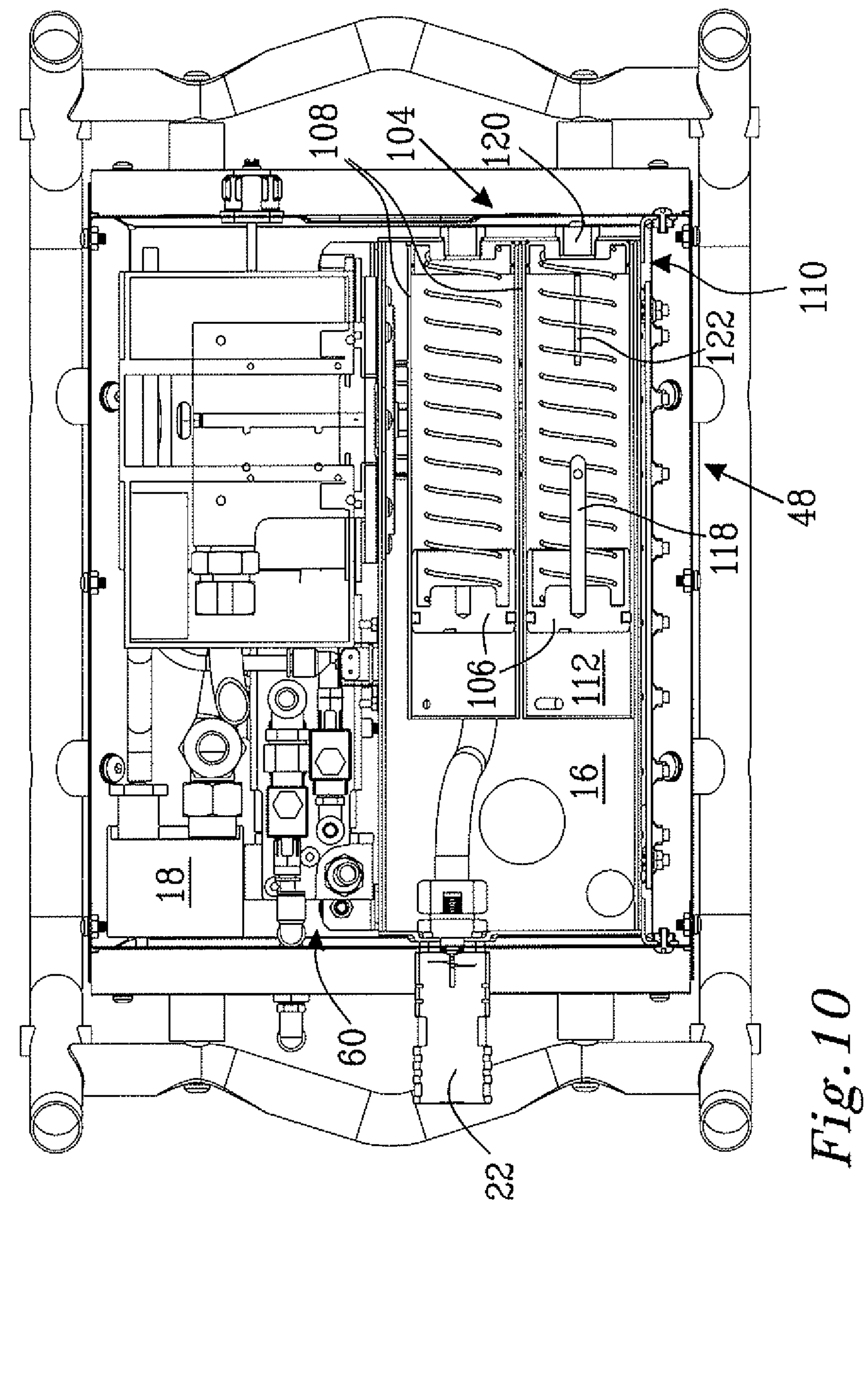

FIGS. 8-10 illustrate three different cross-sections through a hydraulic unit 2 according to embodiments. The hydraulic unit 2 comprises an electric motor, a hydraulic pump 40 driven by the electric motor, an oil tank 16, a heat exchanger 18 arranged for liquid cooling of oil, an oil inlet, an oil outlet 22, a cooling liquid inlet, a first cooling liquid outlet, and a regulator 60 for a cooling liquid pressure. The hydraulic unit 2 further comprises a first conduit system for oil and a second conduit system for cooling liquid. In operation of the hydraulic unit 2, a pressurized flow of oil flows to a user of an oil flow via the oil outlet 22. The oil flows back from the user through the oil inlet into the hydraulic unit 2. The oil is cooled in heat exchanger 18 by a cooling liquid, e.g. cooling water. The cooling liquid flows into the hydraulic unit 2 via the cooling liquid inlet and out of the hydraulic unit 2 via the first cooling liquid outlet.

The hydraulic pump 40 is arranged inside the oil tank 16. The oil tank 16 is provided with a volume compensator 104 arranged inside the oil tank 16. The volume compensator 104 is arranged to expand when a volume of oil in the oil tank 16 decreases. In this manner, air pockets in the oil tank 16 may be avoided to a large extent. The volume compensator 104 comprises two movable pistons 106. Each piston 106 is movably arranged in a tube 108. The tube 108 has an opening at each end. At a first end 110, the tube 108 communicates with an ambient environment of the hydraulic unit 2. At a second end 112, the tube 108 communicates with an internal space of the oil tank 16. A spring 114 presses each piston 106 in a direction towards the second end 112 of each tube 108. Pegs 115 prevent the piston 106 from being pushed out of the tubes 108 by the springs 114. The springs 114 and the pistons 106 may be adapted to provide a maximum pressure of about 0.5 Bar in the oil tank 16. The oil tank 16 may have a volume of about 8 liters. Each tube 108 of the volume compensator 104 may have a length of about 250 mm, and each piston 106 may have a diameter of about 55 mm.

Thus, each piston 106 is moved towards the second end 112 of each tube 108 when the volume of oil in the oil tank 16 decreases. In other words, the volume compensator 104 occupies a smaller volume in the oil tank 16 when the piston 106 is in a first position than when the piston 106 is in a second position, the first position being closer to the first end 110 of the tube 108 than the second position.

A position indicator 116 is connected with one of the pistons 106 and is visible from outside the oil tank 16 when the piston 106 is in the first position. The position indicator 116 comprises a pin 118 which is visible at an opening 120 at the first end 110 of the tube 108, i.e. when the piston 106 is in the first position. In this manner, a user may verify from the outside of the oil tank 16 that the oil tank 16 is filled with oil, for instance when oil is replenished in the oil tank 16.

The oil inlet and the oil outlet 22 each comprise a check valve which prevents oil flowing out of the hydraulic unit 2 when it is not connected to a user, and for example when oil is replenished via the oil inlet. Such a check valve may form part of a so-called quick coupling.

One of the pistons 106 and a slot 122 in one of the tubes 108 forms an overflow valve 48 of the oil tank 16. The slot 122 leads outside the oil tank 16. When the piston 106 passes one end of the slot 122, oil flows out from the oil tank 16 via the tube 108 and the slot 122.

FIGS. 8 to 10 also generally illustrate a tank 16 for liquid which may be used in applications other than in connection with the illustrated hydraulic unit. A volume compensator 104 is arranged inside the tank 16. The volume compensator 104 is arranged to expand when a liquid volume in the tank 16 decreases. In this manner, air pockets in a liquid in the tank 16 may be avoided to a large extent. The volume compensator 104 comprises two movable pistons 106. Each piston 106 is movably arranged in a tube 108. The tube 108 has an opening at each end. At a first end 110, the tube 108 communicates with an ambient environment of the tank 16. At a second end 112, the tube 108 communicates with an internal space of the tank 16. A spring 114 pushes each piston 106 in a direction towards the second end 112 of each tube 108. Pegs 115 directed inwardly into the tube 108 prevent the pistons 106 from being pushed out of the tubes 108 by the springs 114. The springs 114 and the pistons 106 may be adapted to provide a maximum pressure of e.g. 0.5 Bar in the tank 16.

Thus, each piston 106 is moved towards the second end 112 of each tube 108 when the volume of liquid in the tank 16 decreases. In other words, the volume compensator 104 occupies a smaller volume in the tank 16 when the piston 106 is in a first position than when the piston 106 is in a second position, wherein the first position is closer to the first end 110 of the tube 108 than the second position.

A position indicator 116 is connected with one of the pistons 106 and is visible outside the tank 16 when the piston 106 is in the first position. The position indicator 116 includes a pin 118 which is visible at an opening 120 at the first end 110 of the tube 108, i.e. when the piston 106 is in the first position. In this manner, a user may verify from the outside of the tank 16 that the tank 16 is filled with liquid, e.g. when liquid is filled in the tank 16.

One of the pistons 106 and a slot 122 in one of the tubes 108 forms an overflow valve 48 of the tank 16. The slot 122 leads outside the tank 16. When the piston 106 passes one end of the slot 122, liquid flows out from the tank 16 via the pipe 108 and the slot 122.

Figure 11:
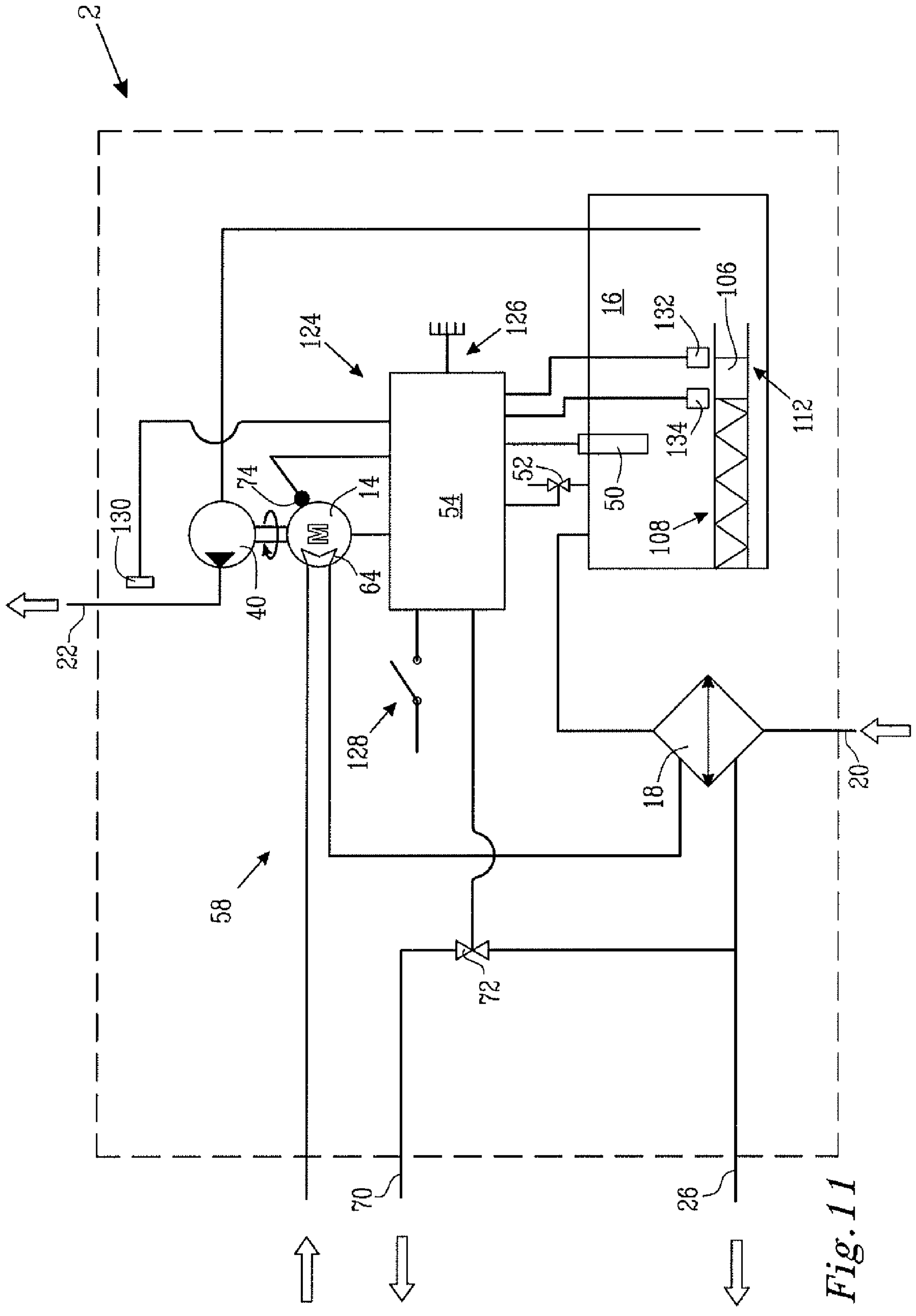
FIG. 11 illustrates embodiments of a control arrangement of a separate hydraulic unit for providing at least one user with an oil flow.

FIG. 11 illustrates embodiments of a control arrangement 124 for a hydraulic unit 2 for providing at least one user with an oil flow. The hydraulic unit 2 may be formed according to embodiments described herein in connection with FIGS. 1-10 and comprises an electric motor 14 and a hydraulic pump 40, which is driven by the electric motor 14. The oil flows during operation into the hydraulic unit via an oil inlet 20 and is cooled in a heat exchanger 18 by cooling liquid. The control arrangement 124 includes a control device 54. The control device 54 may be arranged to control one or more functions of the hydraulic unit 2, but is at least arranged for controlling the electric motor 14. The electric motor 14 may be a permanent magnet motor.

The hydraulic unit 2 comprises a second conduit system 58 which is arranged to be flowed through by a cooling liquid. The second conduit system 58 comprises a third conduit section 64 arranged in thermal contact with the electric motor 14. In a first operating mode, the cooling liquid flows out of the cooling circuit 58 through a first cooling liquid outlet 26. A second cooling liquid outlet 70 is connected to the second conduit system 58. A controllable first valve 72 is arranged to open and close the second cooling liquid outlet 70. At the electric motor 14, a temperature sensor 74 is arranged for sensing of the temperature of the electric motor 14. The control device 54 is connected to the temperature sensor 74 and the first controllable valve 72. The control device 54 is arranged to open the first valve 72 when the temperature of the electric motor 14 exceeds a first threshold value, e.g. 100 degrees Celsius. Thus, in a second operating mode, cooling liquid flows out of the second conduit system via the first cooling liquid outlet 26 as well as via the second cooling liquid outlet 70. By opening the first controllable valve 72, an increased flow of cooling liquid through the second conduit 58 and the heat exchanger 18 may be achieved.

The control device 54 is further arranged to reduce an output power delivered by the electric motor 14 when the temperature of the electric motor 14 temperature exceeds a second threshold value, e.g. 110 degrees Celsius.

Furthermore, the control device 54 may be arranged to stop the electric motor 14 when the temperature of the electric motor 14 exceeds a third threshold value, e.g. 120 degrees Celsius.

The control device 54 may be equipped with an interface 126 for data transfer between the control device 54 and an external unit. The interface may include a USB connector. Software updates to the control device 54 and service data from the control device 54 may be transferred via the interface 126.

A switch 128 for switching on and off the hydraulic unit 2 is connected to the control device 54.

A pressure sensor 130 senses the pressure at the oil outlet 22 of the hydraulic unit 2. The pressure sensor 130 is connected to the control device 54. The control device 54 is arranged to control the electric motor 14 depending on sensed pressure. Alternatively, the oil pressure may be sensed indirectly by measuring the torque of the electric motor 14. This may be done by measuring the current through the electric motor 14. In this case, the control device 54 may be arranged to regulate the oil pressure based on the measured current in the electric motor 14. The speed of the electric motor 14 thus, may be controlled based on the measured currents in the electric motor 14.

The oil tank 16 is provided with a volume compensator 104 comprising at least one movable piston 106 described in connection with FIGS. 8-10. At least the end position of the piston at the second end 112 of the tube 108 is sensed by a first position sensor 132. If the piston 106 reaches this end position, the oil level in the oil tank 16 is low and the control device 54 then shuts off the electric motor 14. A second position sensor 134 may be arranged to sense a position of the piston 106 prior to its end position at the second end 112 of tube 108. The control device 54 then sends out a warning signal indicating that oil needs to be replenished. The warning signal may be provided on a display, by a lamp, and/or a speaker (not shown in FIG. 11). More position sensors than the two above-mentioned position sensors 132, 134 may be arranged at the tube 108 for providing an indication of more than two levels of oil in the oil tank 16.

A level sensor 50 and a second valve 52 for venting the oil tank 16 is arranged at the oil tank 16. The level sensor 50 and the second valve 52 are connected to the control device 54. The control device 54 is arranged to open and close the second valve 52 depending on an oil level in the oil tank 16, which is sensed by level sensor 50. If an air pocket is formed in the oil tank 16, it is sensed by the level sensor 50. The control device 54 then opens the second valve 52 until the air has been forced out of the oil tank.

The control device 54 of FIG. 11 is illustrated as one unit but may alternatively comprise several parts, wherein each part governs or controls at least one function in the hydraulic unit 2.

Those skilled in the art understand that the embodiments described above may be combined. Thus, the invention is not limited to the disclosed embodiments. The invention is limited only by the scope of protection defined by the claims.

The invention claimed is:

1. A separate hydraulic unit for supplying at least one user comprising a hydraulic drilling machine or a hydraulic striking breaking machine with an oil flow, the separate hydraulic comprising:

a motor, a hydraulic pump driven by the motor, an oil tank, an oil inlet, an oil outlet, a heat exchanger, a first conduit system for oil, which first conduit system connects at least the oil inlet, the heat exchanger, the oil tank, the hydraulic pump, and the oil outlet, and wherein the heat exchanger is arranged for liquid cooling of oil, wherein the separate hydraulic unit comprises a cooling liquid inlet for connection to a cooling liquid source, a first cooling liquid outlet, and a second conduit system for cooling liquid, which second conduit system connects at least the cooling liquid inlet, the first cooling liquid outlet, and the heat exchanger, and a regulator for cooling liquid pressure arranged in the second conduit system between the cooling liquid inlet and the heat exchanger.

2. The separate hydraulic unit according to claim 1, wherein the heat exchanger comprises a first conduit section and a second conduit section arranged in thermal contact with each other, and wherein the first conduit section is connected to the first conduit system and the second conduit section is connected to the second conduit system.

3. The separate hydraulic unit according to claim 1 wherein the regulator comprises:

a first elastic conduit arranged to be flowed through by cooling liquid, a hollow elastic element arranged to be affected by a liquid pressure in the cooling liquid, which hollow elastic element changes an outer dimension depending on the liquid pressure, and a movable element arranged between the first elastic conduit and the hollow elastic element, which movable element abuts against the hollow elastic element such that a position of the movable element is affected by the outer dimension of the hollow elastic element, wherein a position of the movable element affects a first cross-section of the first elastic conduit, which regulator has a primary side upstream of the first cross-section and a secondary side downstream of the first cross-section, and wherein the hollow elastic element is arranged to be affected by a liquid pressure on the secondary side.

4. The separate hydraulic unit according to claim 3, wherein the movable element comprises a protruding edge arranged to abut against the first elastic conduit such that the first cross-section is changed depending on the moveable element position.

5. The separate hydraulic unit according to claim 3, wherein the movable element is biased in a direction towards the hollow elastic element.

6. The separate hydraulic unit according to claim 5, wherein the movable element is biased by a spring, and wherein a force by which the spring abuts against the hollow elastic element is adjustable.

7. The separate hydraulic unit according to claim 1, wherein the second conduit system comprises a third conduit section arranged in thermal contact with the motor.

8. The separate hydraulic unit according to claim 7, wherein the second conduit system is connected to a second cooling liquid outlet via a controllable first valve.

9. The separate hydraulic unit according to claim 1, wherein the first conduit system comprises a fourth conduit section arranged in thermal contact with the motor.

10. The separate hydraulic unit according to claim 1, wherein the hydraulic pump is arranged inside the oil tank.

11. The separate hydraulic unit according to claim 1, wherein the oil tank comprises a volume compensator arranged inside the oil tank, which volume compensator is arranged to expand when a volume of oil in the oil tank decreases.

12. The separate hydraulic unit according to claim 11, wherein the volume compensator comprises at least one movable piston, and wherein the volume compensator occupies a smaller volume in the oil tank when the piston is in a first position than when the piston is in a second position.

13. The separate hydraulic unit according to claim 12, wherein the volume compensator comprises a spring and the movable piston is moved to the second position by the spring.

14. The separate hydraulic unit according to claim 12, wherein a position indicator is connected with the movable piston and is visible from outside the oil tank, at least when the piston is in the first position.

15. The separate hydraulic unit according to claim 1, wherein a second valve is arranged in the oil tank, which second valve is arranged for venting the oil tank.

16. The separate hydraulic unit according to claim 1, wherein the motor is an electric motor, and wherein the separate hydraulic unit comprises a control device arranged at least for controlling the electric motor.

17. The separate hydraulic unit according to claim 16, wherein the electric motor is a permanent magnet motor.

18. The separate hydraulic unit according to claim 1, further comprising:

a temperature sensor arranged at the electric motor, wherein the temperature sensor is connected to the control device, and wherein the control device is arranged to open the controllable first valve when the electric motor temperature exceeds a first threshold value.

19. The separate hydraulic unit according to claim 16, wherein the control device is arranged to reduce an power output of the electric motor when the electric motor temperature exceeds a second threshold value.

20. The separate hydraulic unit according to claim 16, wherein the control device is arranged to stop the electric motor when the electric motor temperature exceeds a third threshold value.

21. The separate hydraulic unit according to claim 1, wherein the separate hydraulic unit is arranged to generate an oil pressure of up to 240 bar and a flow of oil of up to 80 liters/minute.

22. The separate hydraulic unit according to claim 1, wherein the hydraulic pump is directly driven by the motor.

23. The separate hydraulic unit according to claim 1, further comprising:

a frame of metal tubes which surrounds remaining components of the hydraulic unit.

* * * * *